INVENTORS
LOUIS H. FAURE
ALFRED T. HARDARDT

BY A. Sidney Alpert
ATTORNEY

Oct. 20, 1970 L. H. FAURE ET AL 3,534,470
PROCESS FOR ASSEMBLING MAGNETIC TAPE
HEADS USING A CONSUMABLE FIXTURE
Filed Jan. 4, 1968 5 Sheets-Sheet 4

United States Patent Office 3,534,470

Patented Oct. 20, 1970

3,534,470

PROCESS FOR ASSEMBLING MAGNETIC TAPE HEADS USING A CONSUMABLE FIXTURE

Louis H. Faure, Poughkeepsie, and Alfred T. Hardart, Wappingers Falls, N.Y., assignors to International Business Machines Corporation, Armonk, N.Y., a corporation of New York Filed Jan. 4, 1968, Ser. No. 696,009
Int. Cl. H01f 7/06
U.S. Cl. 29—603 6 Claims

ABSTRACT OF THE DISCLOSURE

A consumable fixture and a process for assembling a multiple track tape head. The fixture contains a plurality of slots and shoulders for receiving shields and magnetic core assemblies each of which has a wound coil thereon. The fixture includes channels that communicate with two potting holes extending to the surface of the fixture. The shields and core assemblies are assembled, a pin connector is installed in the fixture, and the ends of the coils are soldered to the pins of the connector. A housing is then inserted into the fixture and tests are performed for magnetic phasing, continuity and short circuits. The coil connecting wires and the gaps of the core assemblies are then encapsulated by injecting and pouring epoxy into the fixture. After the epoxy is cured, the outer portions of the fixture are broken off, and the remainder of the fixture and the excess portions of the shields are then cut off and the vertical gap portion of the assembly is ground.

BACKGROUND OF THE INVENTION

The invention relates to a consumable fixture and a process of using the fixture for assembling a mangetic tape head.

One prior art process of assembling a magnetic tape head required the use of a high-precision hardened tool steel blade-type fixture which was extremely expensive. Skilled operators had to adjust the blades of the fixture so that the cores would be accurately positioned therein. When such a fixture was used, several different potting and curing steps were required, and the fixture had to be cleaned after each use. Because the fixture was made of steel, magnetic phasing tests could not be made during thte course of the assembly operation, but could be made only after the assembly was completed and removed from the fixture. If a finished tape head had failed to pass the test to which it was then subjected, it could not be reworked and had to be scrapped. In this regard, the rejection rate when using such steel fixtures was generally high, e.g., in the vicinity of twenty-five percent or higher.

Accordingly, it is a general object of this invention to provide an improved fixture for use in assembling multi-track magnetic tape heads and a process of using the fixture for assembling such heads.

It is another object of the present invention to provide consumable non-magnetic fixtures for use in assembling magnetic tape heads, the fixture being inexpensive but permitting assembly of heads to very accurate tolerances.

It is a further object of the present invention to provide an improved process of assembling or fabricating magnetic tape heads that is rapid, efficient and results in lower rejection rates.

SUMMARY OF THE INVENTION

In the preferred embodiment of the present invention, there is provided an inexpensive molded plastic fixture which is consumable, thereby eliminating the need for a large capital investment in fixtures as in the past. The exemplified fixture contains integral slots and shoulders for properly locating the core assemblies, shields, a housing and a pin connector member, thereby eliminating the need for inspection and possible adjustment, and reducing the assembly time by as much as 50 or 60%. The fixture has a built-in encapsulating or potting system which permits bonding and encapsulation steps to be combined. The built-in potting system minimizes operator contact with potting or bonding materials which may be harmful to the human skin. This potting system also permits the use of injection or pressure potting methods, and potting compounds and can now more easily be adapted to automatic dispensing techniques. Furthermore, because the fixture is non-magnetic, magnetic phasing tests of the core assemblies can be performed during the assembly process and before encapsulation, thereby resulting in very low rejection rates compared to the prior art. In addition, the fixture can be used as a packaging device for shipping or storing partially completed tape head assemblies, if desired.

DESCRIPTION OF THE PREFERRED EMBODIMENTS

Figures 1A, 1B:
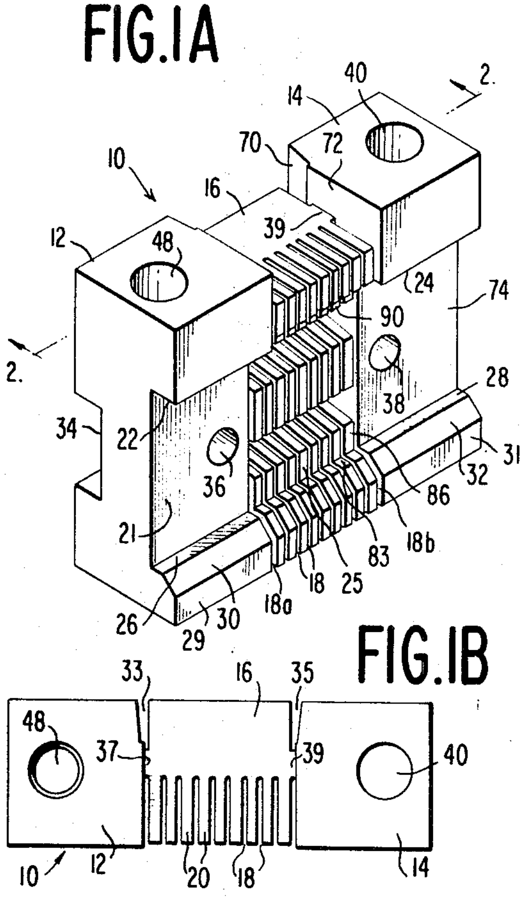
FIG. 1A is a perspective view of the novel fixture for use in the assembly of a multi-track magnetic tape head.
FIG. 1B is a top view of FIG. 1A.

FIG. 1A is a perspective view of a preferred form of the consumable magnetic tape head assembly fixture 10 comprising one aspect of the present invention. The fixture 10 is preferably a molded glass-filled phenolic resin, but may be any suitable non-magnetic material. The fixture 10 is dimensionally stable and non-magnetic, while being relatively low in cost. Each of these features contributes to the usefulness of the exemplified fixture, as will be seen hereinafter.

The exemplified fixture 10 illustrated in FIG. 1A is particularly designed for the assembly of a nine-track tape read head, but may, with minor modification, be used for assembling other read or write heads, such as seven-track heads. The fixture 10 consists of two end portions 12 and 14 and a recessed center portion 16. The center portion 16 contains ten transversely extending shield-retaining slots 18 for accommodating parts of the head during assembly. The two end slots 18*a* and 18*b* are adjacent the end portions 12 and 14 and are slightly wider than the other slots. Nine lands 20 are formed between the slots 18.

A recess 21 is formed in the fixture 10 between upper shoulders 22 and 24 and lower shoulders 26 and 28 of end portion 12 and 14. Inclined surfaces 30 and 32 are formed between shoulders 26 and 28, respectively, and the flat faces 29 and 31 on the end portions 12 and 14, respectively. A recess 34 extends longitudinally across the rear of the fixture 10. Holes 36 and 38 extend completely through the end portions 12 and 14, respectively. Another recess 25 is provided between shoulders 81 and 83.

FIG. 1B illustrates two break-off slots 33 and 35 which are formed in the rear of fixture 10 as seen in FIG. 1A. These slots 33 and 35, with end slots **18*a* and 18*b*, form reduced or weakened areas 37 and 39 by which end portions 12 and 14 are joined to the center portion 16**.

Figure 2:
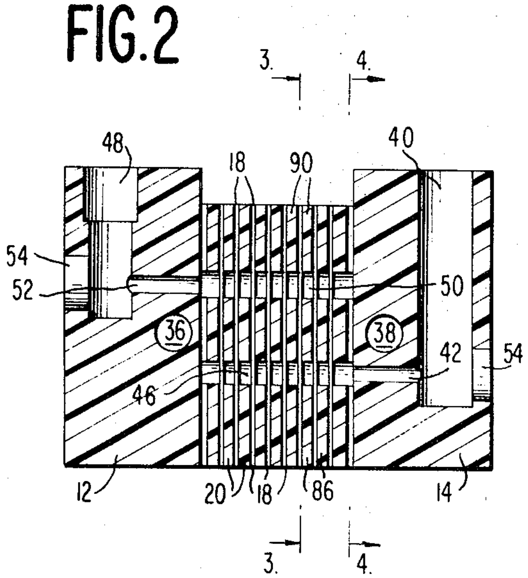
FIG. 2 is a cross-sectional view taken along line 2—2 of FIG. 1A.
Figure 3:
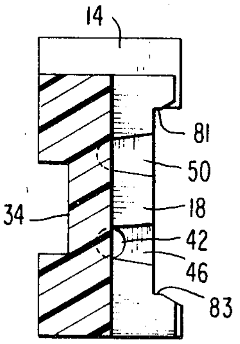
FIG. 3 is a cross-sectional view taken along line 3—3 of FIG. 2.
Figure 4:
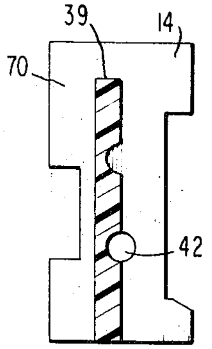
FIG. 4 is a cross-sectional view taken along line 4—4 of FIG. 2.

As shown in FIG. 2, the integral potting system of the fixture 10 consists of a vertical hole or gate 40 extending from the upper surface of end portion 14 and stopping short of the lower surface of portion 14. A longitudinal communicating passageway 42 connects hole 40 and a lower channel 46 extending through the center portion 16 across the lands 18 and slots 20 to the end portion 12. Another vertical potting hole or gate 48 extends from the upper surface of end portion 12 to about half-way through that end portion. A second longitudinal communicating passageway 52 connects hole 48 to a longitudinal upper channel 50 which extends through the slots and lands between the end portions 12 and 14. The passageways 42 and 52 are closed by means of plugs 54 before the fixture 10 is used in the tape head assembly process comprising an aspect of this invention.

The fixture surfaces 70, 72 and 74 on end portion 14 (and also the corresponding surfaces on end portion 12) are coated with a suitable release agent such as "Teflon" so that epoxy potting compounds and bonding agents will not adhere thereto.

Figure 5:
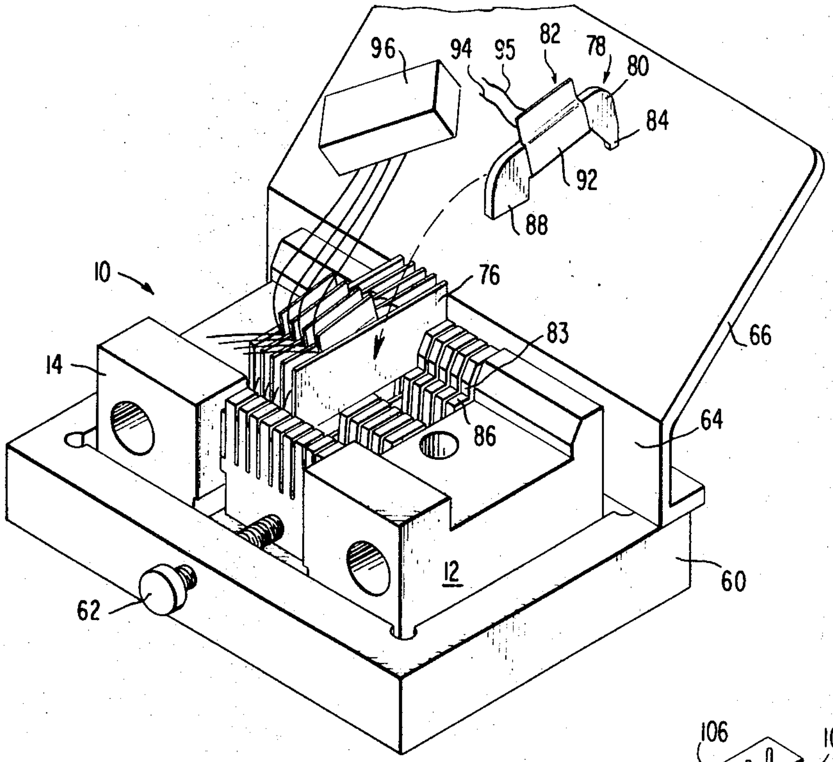

The assembly process, comprising an aspect of this invention, is begun by placing the fixture 10 in a steel holder 60, as shown most clearly in FIG. 5. A clamping screw 62 is adjusted so that the fixture 10 is firmly clamped between the end of the screw and the inner surface 64 of a flange 66 which is a part of the holder 60.

Figure 6:
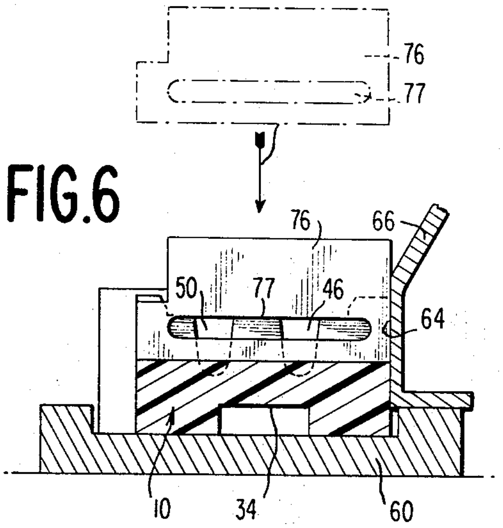
FIGS. 5–9, 11–13 and 15–19 illustrate various steps in the improved assembly process or views of the tape head at different stages of the assembly process.
Figures 19, 20, 21, 22:
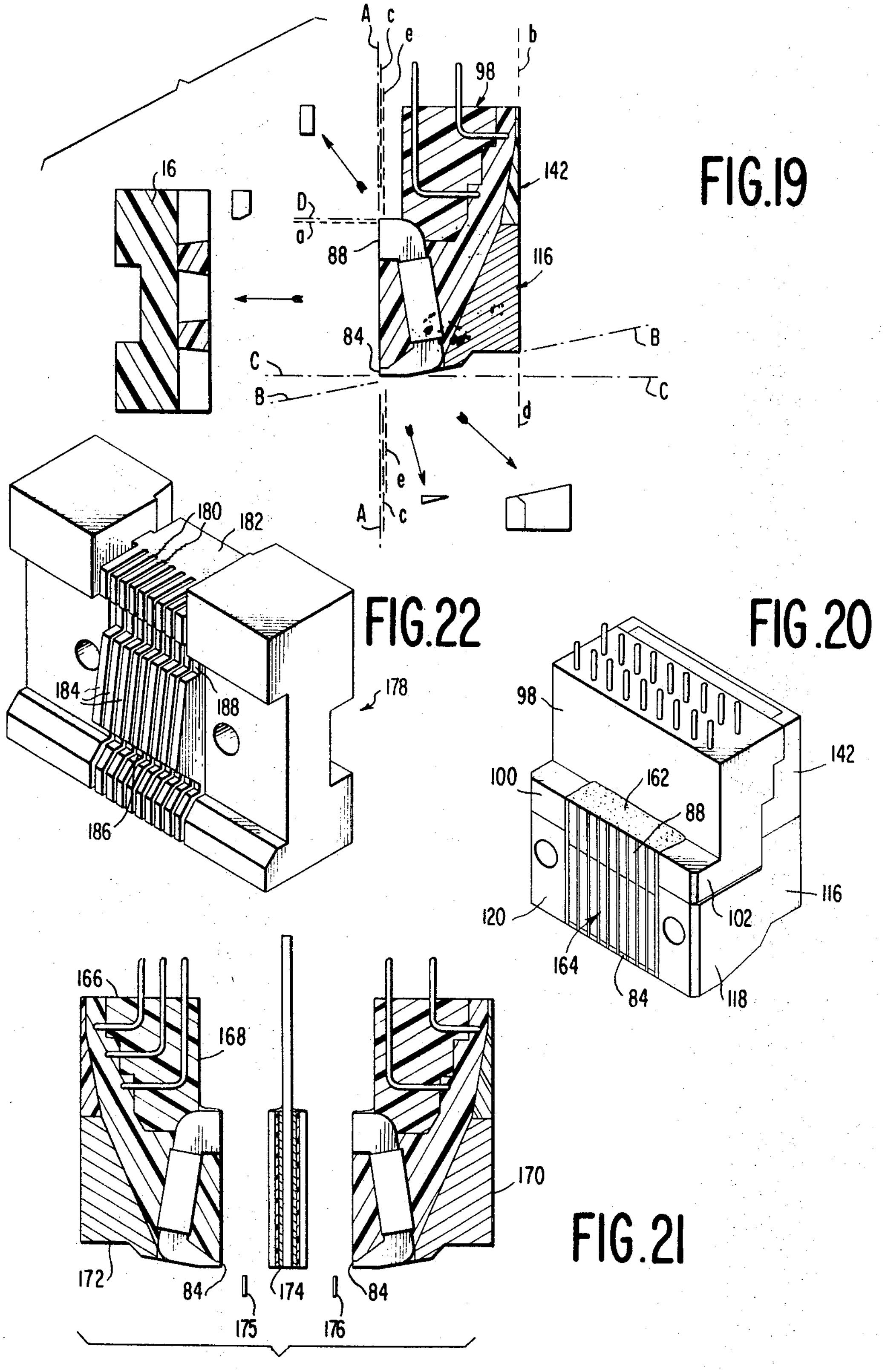
FIG. 20 is a perspective view of a finished tape read head assembly made by the improved process.
FIG. 21 is an exploded view of a complete read-write magnetic tape assembly including both a write head and a read head made by the improved process of this invention.
FIG. 22 is a perspective view of a modified form of the fixture illustrated in FIG. 1A.

The dimensionally stable fixture 10 is provided for assembling the components of one-half of a read-write magnetic tape head (in this case a read head 170 as illustrated in FIG. 21) in accurate alignment with precisely controlled tolerances between the various components thereof. These components include a plurality of copper magnetic shields, a plurality of wound magnetic core assemblies, a pin connector, a plastic cap and a brass or other housing member. As shown in FIG. 6, a first shield 76, having an elongate aperture 77 therein, is inserted into one of the end slots (**18*b* in the exemplification) in fixture 10. FIG. 6 illustrates the position of the shield 76 relative to the potting channels 46 and 50. Next, a wound magnetic core assembly 78 including a generally C-shaped magnetic core 80 and a coil assembly 82 is inserted into the fixture next to the shield 76 so that the pole tip 84 of the core 80 rests upon a land portion 86 and the wider core tip 88 rests upon a land portion 90**.

Figure 7:
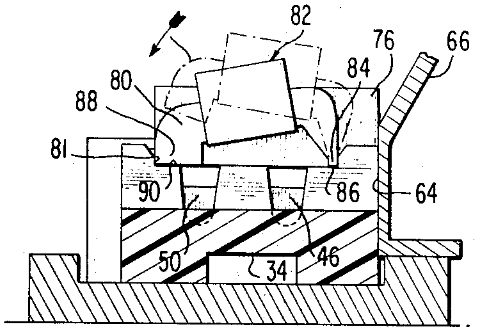

FIG. 7 illustrates the manner of inserting the core assembly 78 between the shoulders 81 and 83 of lands 90 and 86, respectively. It will be seen that the pole tip 84 is inserted first, and that the wider tip 88 is then pivoted down into place. Next, another shield is inserted into the next slot 18, and the core assemblies and shields are alternately placed in position until the nine core assemblies and ten shields are assembled in the fixture, with the fixture 10 serving to accurately locate the core assemblies and shields.

In FIG. 5, there is illustrated five shields and four core assemblies in position in the fixture 10. The coil assembly 82, for example, consists of a coil of wire (not shown) surrounded by an insulating covering 92 from which project two coil connecting wires 94 and 95 of the coil assembly. After all the core assemblies are assembled in the fixture 10, the coil connecting wires 94 and 95 are clamped to the flange 66 of holder 60 by suitable means such as the illustrated rubber magnet 96. While the coil assemblies have only two coil connecting wires 94 and 95 in the illustrated embodiment, with a write head being assembled, each coil assembly would have three coil connecting wires.

Figure 9:
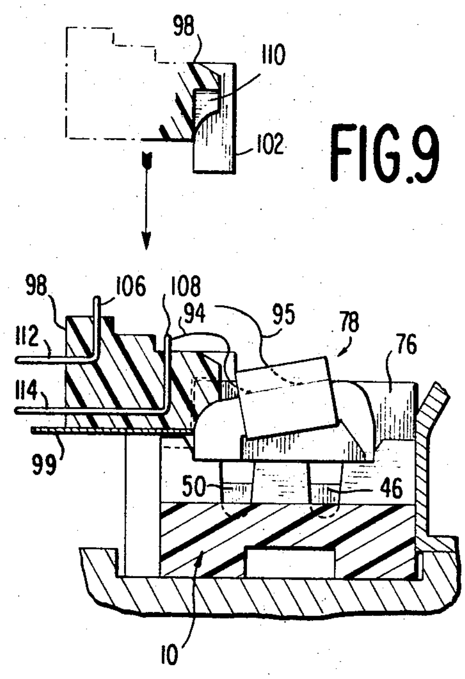
Figure 8:
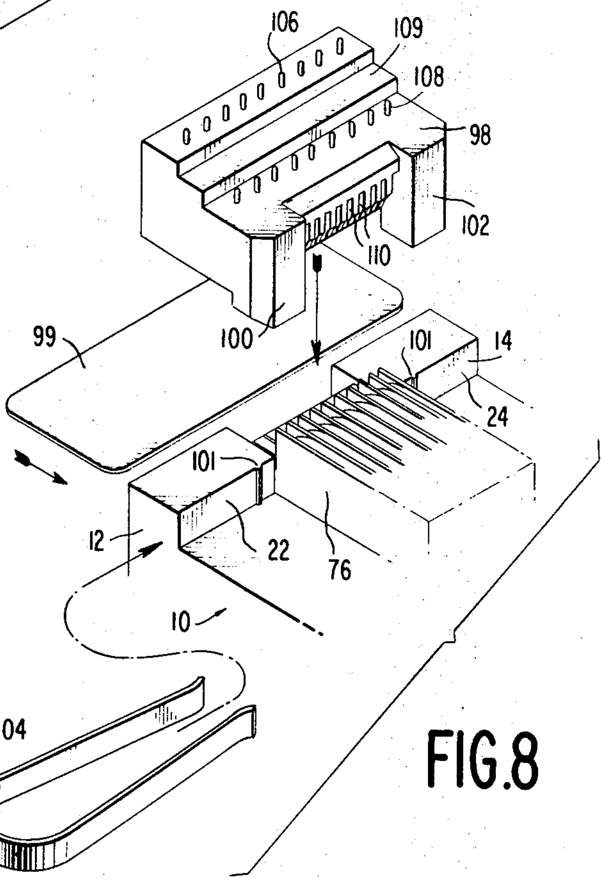

A plastic pin connector 98 is then placed on the fixture 10 as illustrated in FIGS. 8 and 9. However, first, the areas of the connector 98 that will enage the fixture 10 are also coated with a release agent as described above in connection with the fixture. The connector 98 has legs 100 and 102 including rear edges which engage the shoulders 22 and 24 on fixture end portions 12 and 14, respectively. Each shoulder 22 and 24 has a crush lip 101 thereon that engages the legs 100 and 102 for a purpose to be explained hereinafter.

Two nylon clamps 104 (only one of which is shown) are used to temporarily hold the connector 98 in place on the fixture 10. The clamps 104 engage the outside surfaces of end portions 12 and 14 and the inner surfaces of legs 100 and 102 to temporarily clamp the connector 98 in place. A thin shim or gauge 90 (0.108 inch in the exemplication) is inserted between end portions 12 and 14 and the connector 98 to insure that there will be some slack in the coil connecting wires 94 and 95 after they are soldered, thereby reducing the possibility of breaking the wires during subsequent assembly steps. The connector 98 has a first row of terminals 106 and a second row of terminals 108. In the next step of assembling the tape head, the coil wires 94 and 95 of each coil assembly 82 are wrapped around corresponding pairs of terminals 106 and 108 and soldered thereto. The shim 99 is then removed. If a write head were being assembled, there would be a third row of terminals on step 109 of connector 98 and the third coil wire of each core assembly 82 would be soldered thereto.

The connector 98 contains ten slots 110 which are in alignment with the slots 18 in fixture 10 when the connector is properly positioned on the fixture. FIG. 9 shows in detail the position of the surfaces of the connector 98 relative to a shield 76 and fixture 10 when the connector is in place. The upper part of FIG. 9 shows a cross-sectional view of the connector 98 taken through one of the slots 110. FIG. 9 also shows that the terminals 106 and 108 are part of corresponding groups of L-shaped conductors which extend through the connector to form corresponding connecting pins 112 and 114. As previously explained, for a write head, there would be a third group of conductors and corresponding pins.

At this stage of assembly, in-process magnetic tests may be made as the fixture is non-magnetic and will not adversely affect magnetic measurments. Such is not the case, of course, with the prior art type of steel fixture, and this is believed to be at least one reason why the rejection rate of tape heads has been drastically reduced by the present invention. Electrical tests may also be made at this time. These magnetic and electrical tests include checking corresponding pairs of terminals 106 and 108 for proper phasing of the coils on the cores, checking the continuity from one terminal to the corresponding terminal in each pair, and checking for short circuits in the coil windings. Any wiring irregularities, etc. discovered by these tests may be readily corrected at this time as the assembly has not yet been potted or encapsulated.

Figure 10:
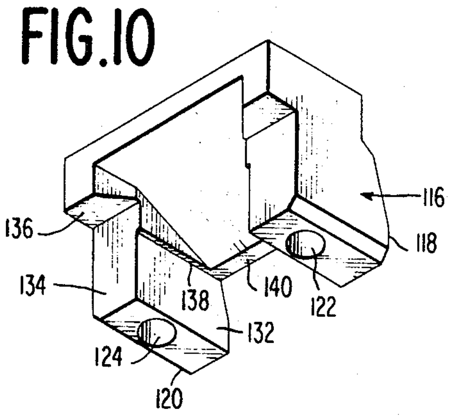
FIG. 10 is a perspective view of the tape head housing.

FIG. 10 shows a housing 116 of a suitable conductive material such as brass. The housing 116 includes two legs 118 and 120 each containing bore holes 122 and 124, respectively, which are intended to mate with the holes 36 and 38 in fixture 10. Prior to assembling the housing 116 on the fixture 10, the surfaces 132, 134, 136 and 138 on leg 120 are coated with a pasty, viscous epoxy such as the epoxy manufactured by the Kenics Company under the name "A–1000." The corresponding surfaces on leg 118 are similarly coated. Surface 140 is coated with a heavy layer of epoxy which fills the void between that surface and the tops of cores 80.

Figure 12:
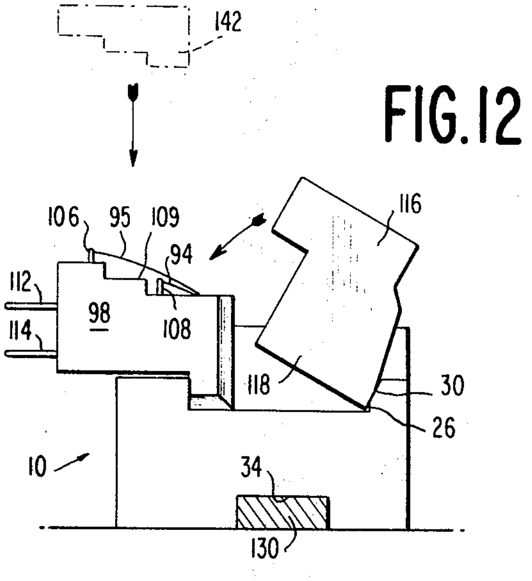

After the epoxy is applied thereto, the housing 116 is snapped into place in the fixture 10 so that the legs 118 and 120 are firmly held between the shoulders 26 and 28 and the connector 98. By this action, the previously mentioned crush lips 101 are deformed, thereby acting to hold the connector 98 and housing 116 in place in the fixture 10. In addition, the crush lips 101 force and retain the housing against shoulders 26 and 28 and thereby provide, in effect, a reference plane or locator for the housing 116 with respect to the core assemblies 78. Thus, as will be seen in FIG. 1A, the shoulders 83 are recessed with respect to shoulders 26 and 28, and hence the inner edges of the cores 80 are offset with respect to the rear edge of the housing by a preselected amount that is determined without having to be separately gauged. Of course, the clamps 104 are removed before the housing 116 is snapped into place. Bolts 126 and 128 are passed through the holes 122 and 124 and are screwed into hex nuts 130, thereby firmly clamping together the fixture 10 with the housing and connector. FIG. 12 illustrates the manner in which the housing 116 is snapped into the fixture 10. The inclined surfaces 30 and 32 of fixture 10 permit the housing 116 to be tilted as it is inserted so that the housing snaps into place between the connector 98 and the shoulders 26 and 28 on fixture 10.

Figure 13:
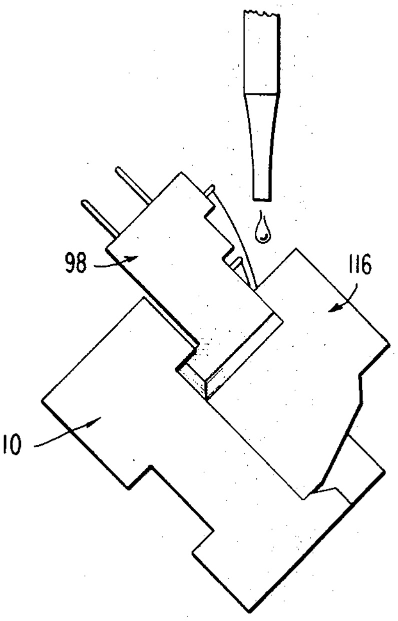

At this time, the assembly may once again be checked for correct magnetic phasing, circuit continuity and short circuits. A preselected number of drops of a liquid bonding epoxy, sufficient to bond the shields 76 to the core assemblies 78, is then applied to the shields and core assemblies as illustrated in FIG. 13 through opening 117. The liquid epoxy flows by capillary action between the shields and core assemblies and substantially fills the spaces therebetween. In the exemplification, approximately five drops of liquid epoxy of the type manufactured by the Kenics Company under the name "X–66" were used.

Figure 14:
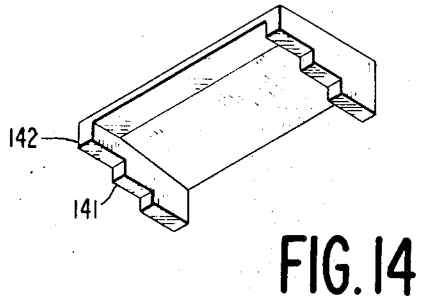
FIG. 14 is a perspective view of a plastic cap used for covering the terminals of the pin connector after soldering.

A plastic wire protector cap 142 (shown in FIG. 14) is then cemented in place on the connector 98 as illustrated in FIG. 12. A quick setting contact adhesive such as "Eastman 910" may be used for this purpose. The corresponding steps 109 and 141 of the connector 98 and cap 142, respectively, provide a good indication whether the cap is properly seated on the connector 98. Electrical continuity and short circuit tests may, if desired, be made again at this point to insure that the coil wires are not damaged. The exterior surfaces of the housing 116 and the connector pins 112 and 114 are then coated with a suitable release agent after the cap 142 is in place. The entire assembly in the holder 60 is then placed in a preheat oven (not shown) for approximately fifteen minutes at approximately 100° centigrade, in order to preheat the fixture 10 prior to the potting operation that follows. The warmed fixture 10 will help maintain the potting compound in a fluid condition thereby facilitating its flow into the fixture 10 and will also help drive out any air pockets that may otherwise remain. Additionally, the preheat operation will set up or cure the epoxy previously applied to the housing and between the shield and core assemblies, thereby insuring that there will be no mixture of the potting compound and epoxies as would otherwise be possible, which could prove detrimental.

Figure 15:
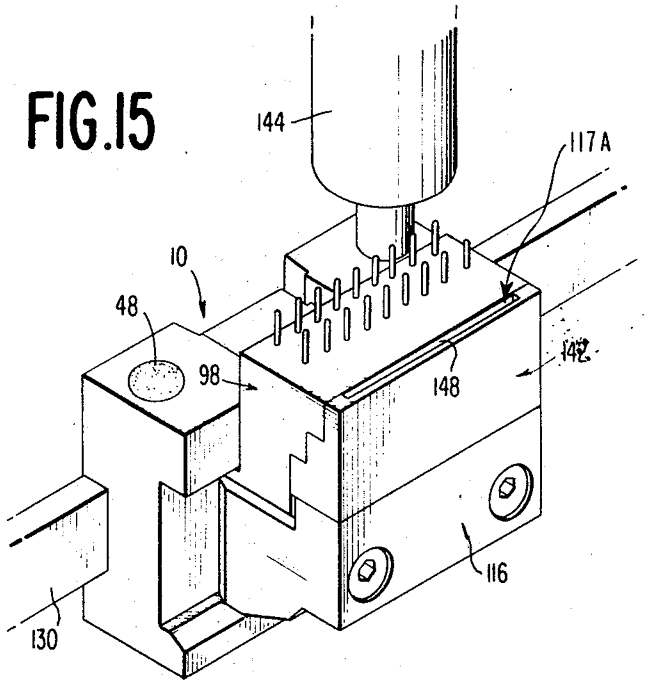
Figure 16:
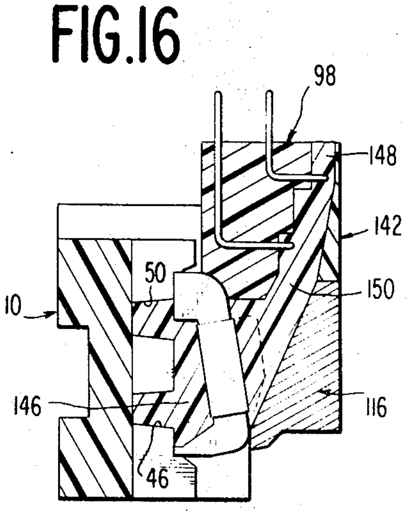

The potting step is illustrated in FIG. 15, where it will be seen that a plastic syringe 144 is inserted into the vertical hole 40 of end portion 14. The syringe 144 contains a suitable liquid potting compound, such as an epoxy resin, and is connected to a compressed air line (not shown) for injecting the potting compound. The potting compound is continuously injected into the hole 40 until the potting compound is seen rising in the hole 48 to the surface of end portion 12 of the fixture 10. The path of the potting compound may be best appreciated by referring to FIGS. 2, 6 and 7. The potting compound flows downwardly through the vertical hole or gate 40 and into communicating passageway 42 through the channel 46, passing through the apertures 77 in the shields 76. The compound also flows upwardly through the elongate apertures 77 to channel 50 where it also flows through the apertures 77 in the shields 76 to the upper communicating passageway 52 and then into the vertical potting hole 48. In this manner, by potting from the bottom in effect, air is forced ahead of the potting compound out of the gate or vertical hole 48 thereby tending to eliminate holes or air pockets in the cured potting compound. The space between the poles 84 and 88 is also filled with the potting compound. The filled space is indicated by the reference numeral 146 in FIG. 16. The compound also fills the space between each core and its adjacent shield, if any space remains.

Next, potting compound is poured slowly through opening 117A into the wire cavity 148 formed between the pin connector 98, the housing 116 and the plastic cap 142. The area filled by the potting compound poured into the wire cavity 148 is indicated by the reference numeral 150 in the cross-sectional view of FIG. 16. This potting compound encapsulates the coil connecting wires 94 and 95, and together with the potting compound inserted by the syringe 144 functions, after curing, to firmly bond together the shields, core assemblies, connector housing and wire protector cap.

In order to cure the exemplified potting compound, the fixture 10 containing the tape head assembly is placed into an oven (not illustrated) at approximately 110° centigrade for approximately fifteen minutes. The fixture 10 is then removed from the oven, and the wire cavity 148 is refilled with potting compound, if necessary, as the level of potting compound may have receded away from the opening 117. The assembly is then returned to the oven and cured at approximately 100° centigrade for approximately one hour. The fixture 10 and assembly are then removed from the oven and allowed to cool. Excess potting compound may be removed by scraping, and the assembly may be further cleaned if necessary in a sonic cleaner or the like.

Figure 17:
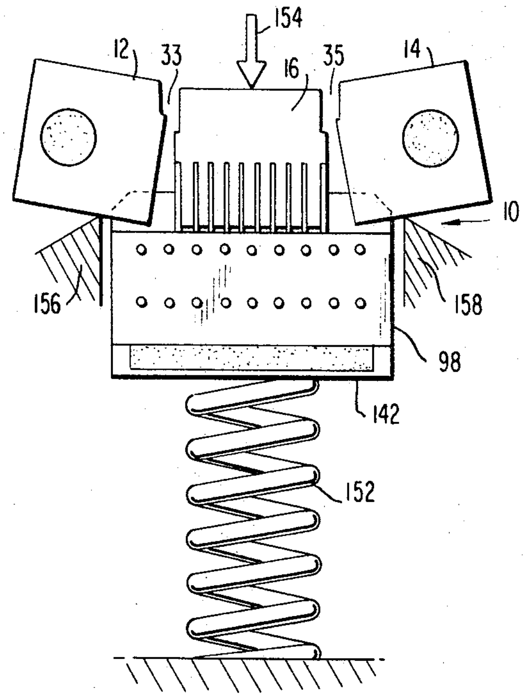
Figure 18:
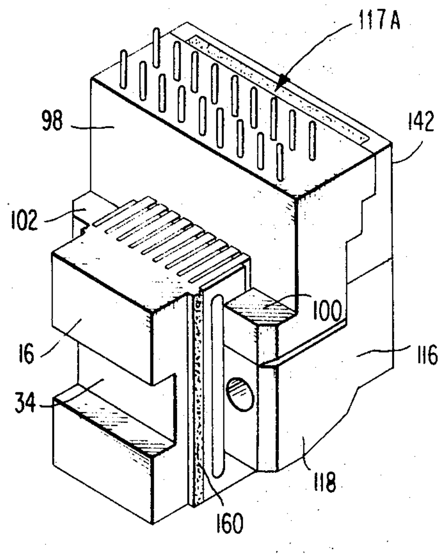

The nuts 130 and the bolts 126 and 128 are removed and fixture 10 is then placed in a breakoff device 171 as schematically shown in FIG. 17. The device 171 has a compression spring 152 for supporting the fixture 10 and two shoulders 156 and 158 for engaging the fixture end portions 12 and 14. A suitable press ram (not shown) applied a downward force on the center portion 16 as indicated by arrow 154, thereby breaking off the end portions 12 and 14 along the breakoff slots 33 and 35 that extend transversely between the end portions and center portion. FIG. 18 shows the magnetic tape head assembly after the end portions 12 and 14 have been broken off. Reference numeral 160 designates the surface on the center portion from which one of the end portions is broken.

To finish the fabrication of the tape head, several cutting and grinding operations are made to remove the center portion 16 of the original fixture 10, to remove excess portions of the magnetic fields 76, cores 80 and potting compound, and to finish the tape head gap area to desired accurate dimensions. These steps are illustrated in FIG. 19. First, the fixture portion 16 is removed by cutting with a suitable tool along plane A—A. During this operation, the slotted portion of shields 76 in fixture portion 16 are also removed and the ends 84 and 88 of the core assemblies are exposed. Subsequent similar cutting operations are performed along planes indicated by lines B—B, C—C and D to remove the remaining portions of the consumbale fixture 10 and the shields 78.

A grinding operation is then performed at the level of plane D bringing the surface to the level indicated by dotted line "*a*." A silver epoxy coating 162 may then be applied in the bit area as shown in FIG. 20 and cured at 100° centigrade for approximately one hour. The function of this coating 162 is to reduce or draw off eddy currents when the tape head is in operation. A further grinding operation removes material from the plastic cap 142 along the plane indicated by dotted line "*b*." The head is now ready for grinding of the gap surface which comprises three steps, a first step consisting of grinding the head along the plane of dotted line "*cc*" for cleaning the gap surface, a second step consisting of grinding the gap surface until the dimension between the plane indicated by dotted line "*ee*" and the plane of the back of the housing reaches a desired accurate dimension.

The foregoing description has illustrated the assembly of a read head 170 forming one-half of a finished tape head (see FIG. 21). In the head portion 170, each coil assembly has two wires and the pin connector 98 has two sets of pins. A write head 166, also shown in FIG. 21, can be assembled in the same manner except that a pin connector 168 is utilized having three rows of pins to correspond with the three connecting wires of each write coil assembly. FIG. 21 also illustrates the manner in which a finished read head 170 and a finished write head 172 may be combined with a magnetic return center section 174 to form a complete read-write tape head assembly. Shims 175 and 176 are provided to obtain the desired gap between the pole tips 84.

While in FIG. 19 various material removal steps have been shown during the final stages of fabricating the tape head portion 170, it will be appreciated that several steps may be eliminated if desired by shaping the shields 76 to conform to the outer peripheral shape of the core assemblies 78. This will eliminate the necesstiy for making the cuts along lines B—B and C—C for removal of shield portions that protrude outwardly of the core assemblies.

FIG. 22 illustrates a modified consumable plastic fixture 178 which is identical to the fixture 10 illustrated in FIG. 1A with two important exceptions. First, the lands between the slots 180 in the center portion 182 have integral raised shoulders 184 which are shaped to conform with the recess in the C-shaped cores 80 formed between the pole tips 84 and 88. These integral shoulders eliminate the need for a potting compound to fill up the space between the pole tips of each core. Consequently, the integral potting system including the holes 40 and 48, passageways 42 and 52 and channels 46 and 50 are not formed in this modified structure.

Figure 11:
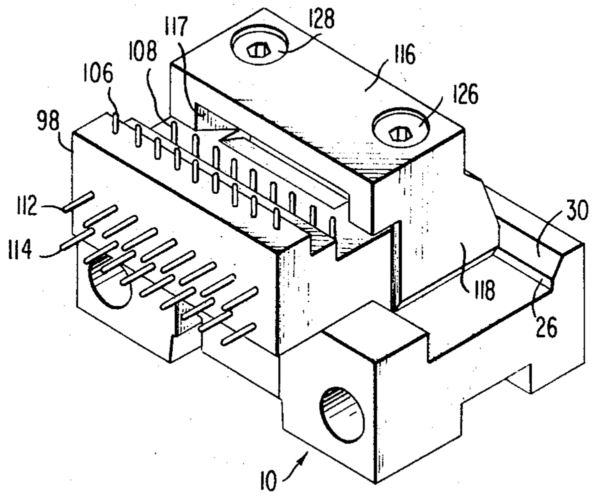

More specifically, in assembling a tape head using the modified structure of FIG. 22, the core assembly 78 is inserted so that the pole tip 84 is positioned in recess 186 and the pole tip 88 is inserted in the recess 188. Furthermore, during assembly of a tape head, when the fixture is "consumed," or removed, these raised shoulders 184 are not removed when the cut is made along line A—A as illustrated in FIG. 19. When using this modified structure, potting is accomplished by introducing fifteen drops of a liquid bonding epoxy, such as Kenics Company's "X–66," into the cavtiy formed by housing 116 and the connector 98 as illustrated in FIG. 13. The wire protector cap 142 is then cemented in place. Next, the fixture is preheated and potting compound is poured into the slot 117 illustrated in FIG. 11 to pot the coil connecting wires. The remaining steps of the assembly process are the same as those described in connection with the fixture illustrated in FIG. 1A; however, each shield 76 need not contain an elongated aperture 77 since an internal potting system is not included in the modified structure of FIG. 22. Furthermore, the fixture of FIG. 22 is for a write head, and, consequently, the slots are narrower and the lands wider to conform to the write shields and core assemblies.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of assembling a magnetic tape head that includes a plurality of spaced apart magnetic core assemblies separated by magnetic shields, a connector member and a housing, by using a consumable fixture, the method comprising:

(a) positioning magnetic shields in spaced slots in the fixture,
(b) locating magnetic core assemblies on the fixture between adjacent shields,
(c) mounting a connector member on the fixture,
(d) connecting coils of each mangetic core assembly to terminals carried in the connector member,
(e) locating a housing on the fixture adjacent the connector member and over the core assemblies and the shields to form with the fixture and connector member a cavity,
(f) introducing a liquid potting compound into the cavity around the shields and core assemblies,
(g) curing the liquid potting compound, and
(h) removing substantially the fixture extending outside the magnetic core assemblies leaving the assembled magnetic tape head intact.

2. The method defined in claim 1 further comprising the step of testing the core assemblies for proper magnetic phasing at preselected times prior to introducing a liquid potting compound into the cavity in order to permit rewriting of any incorrectly wired core assemblies.

3. The method defined in claim 1 further comprising removing substantially all of the consumable fixture.

4. The method defined in claim 1:

(a) wherein removing the step includes breaking off end portions of the fixture, and
(b) further comprising removing excess portions of the shields, core assemblies and cured potting compound.

5. The method of claim 1 wherein the step of introducing a liquid potting compound into the cavity around the shields and core assemblies comprises injecting the liquid potting compound through integral potting holes in the fixture into the cavity in which the shields and core assemblies are located.

6. The method of claim 1 wherein the step of introducing a liquid potting compound into the cavity around the shields and core assemblies comprises forcing the liquid potting compound into the cavity formed by the fixture, connector member and housing in which the shield and core assemblies are located.

References Cited

UNITED STATES PATENTS

| | | | |
|---|---|---|---|
| 2,915,812 | 12/1959 | Rettinger | 29—603 |
| 2,988,804 | 6/1961 | Tibbetts | 264—317 X |
| 3,319,238 | 5/1967 | Jacoby | 29—603 X |
| 3,348,301 | 10/1967 | Schulte | 29—603 |
| 3,400,386 | 9/1968 | Sinnott | 29—603 |
| 3,064,333 | 11/1962 | Kristiansen et al. | 29—603 |

JOHN F. CAMPBELL, Primary Examiner

C. E. HALL, Assistant Examiner

U.S. Cl. X.R.

29—203, 418; 179—100.2; 264—317, 334